(12) United States Patent
Ga

(10) Patent No.: US 12,333,871 B2
(45) Date of Patent: Jun. 17, 2025

(54) CONTROL APPARATUS OF VEHICLE, AND OPERATING METHOD OF THE SAME, VEHICLE

(71) Applicants: Hyundai Motor Company, Seoul (KR); Kia Corporation, Seoul (KR)

(72) Inventor: Han Seon Ga, Gwangmyeong-Si (KR)

(73) Assignees: Hyudai Motor Company, Seoul (KR); Kia Corporation, Seoul (KR)

( * ) Notice: Subject to any disclaimer, the term of this patent is extended or adjusted under 35 U.S.C. 154(b) by 374 days.

(21) Appl. No.: 17/497,397

(22) Filed: Oct. 8, 2021

(65) Prior Publication Data

US 2022/0292892 A1 Sep. 15, 2022

(30) Foreign Application Priority Data

Mar. 12, 2021 (KR) .................... 10-2021-0032850

(51) Int. Cl.
*G07C 5/08* (2006.01)
*B60C 23/04* (2006.01)
*B60K 1/02* (2006.01)
*B60K 17/356* (2006.01)
*G01P 3/00* (2006.01)

(52) U.S. Cl.
CPC ........ *G07C 5/0816* (2013.01); *B60C 23/0488* (2013.01); *B60K 1/02* (2013.01); *B60K 17/356* (2013.01); *G01P 3/00* (2013.01); *G07C 5/0808* (2013.01)

(58) Field of Classification Search
CPC .. G07C 5/816; G07C 5/0808; B60C 23/0488; B60K 1/02; B60K 17/356; G01P 3/00
See application file for complete search history.

(56) References Cited

U.S. PATENT DOCUMENTS 7,286,915 B2 * 10/2007 Lee .................. B60W 10/26
477/3
8,573,045 B2 11/2013 Gotschlich
8,970,361 B2 3/2015 Sakagami et al.
(Continued)

FOREIGN PATENT DOCUMENTS

EP 2190682 B 12/2017
JP 05133831 A * 5/1993 ............. B60C 23/06
(Continued)

OTHER PUBLICATIONS

Translation of JPH05133831A (Year: 1993).*
(Continued)

*Primary Examiner* — Babar Sarwar
(74) *Attorney, Agent, or Firm* — Morgan, Lewis & Bockius LLP

(57) ABSTRACT

A vehicle control apparatus may include an information acquisition device configured to acquire information related to at least one motor in a vehicle and information related to a plurality of wheel speed sensors; a calculator configured to determine an estimated wheel speed value according to the information related to the at least one motor and the information related to the wheel speed sensors; and a controller configured to determine an air pressure state of a tire corresponding to each of the wheel speed sensors of the vehicle according to the estimated wheel speed value and the information related to the wheel speed sensors.

15 Claims, 9 Drawing Sheets

(56) References Cited

U.S. PATENT DOCUMENTS

| | | |
|---|---|---|
| 9,387,735 B2 | 7/2016 | Lee |
| 2003/0126915 A1* | 7/2003 | Kiyota ................. G01R 31/343 73/115.01 |
| 2003/0167116 A1* | 9/2003 | Erban ..................... B60T 8/885 701/93 |
| 2010/0211250 A1 | 8/2010 | Fischer et al. |
| 2015/0343860 A1* | 12/2015 | Lee ......................... B60L 3/102 701/36 |
| 2016/0250930 A1* | 9/2016 | Collins ............... B60L 15/2036 701/22 |
| 2017/0158178 A1* | 6/2017 | Kerber ................. B60T 8/1764 |
| 2017/0355360 A1* | 12/2017 | Reed ..................... B60W 20/10 |
| 2018/0162349 A1* | 6/2018 | Chang .................. B60W 20/00 |
| 2019/0197797 A1* | 6/2019 | Na ......................... G08G 1/205 |
| 2019/0202465 A1* | 7/2019 | Kato ......................... G01P 3/50 |
| 2019/0344796 A1* | 11/2019 | Lian ................ B60W 30/18172 |
| 2020/0139770 A1 | 5/2020 | Kang |
| 2020/0398850 A1* | 12/2020 | Gariepy ................. G01C 21/26 |
| 2021/0150833 A1* | 5/2021 | Koo ..................... G07C 5/0866 |

FOREIGN PATENT DOCUMENTS

| | | | |
|---|---|---|---|
| JP | H06-278424 A | | 10/1994 |
| JP | 2008110742 A | * 5/2008 | .......... B60C 23/061 |
| JP | 2018-164367 A | | 10/2018 |

OTHER PUBLICATIONS

Translation of JP2008110742A (Year: 2008).*
The extended European search report for EP 21208894.2 dated May 2, 2022.

* cited by examiner

CONTROL APPARATUS OF VEHICLE, AND OPERATING METHOD OF THE SAME, VEHICLE

CROSS-REFERENCE TO RELATED APPLICATION

The present application claims priority to Korean Patent Application No. 10-2021-032850, filed on Mar. 12, 2021, the entire contents of which is incorporated herein for all purposes by this reference.

BACKGROUND OF THE INVENTION

Field of the Invention

The present invention relates to a vehicle control apparatus, an operating method thereof, and a vehicle.

Description of Related Art

In general, a vehicle tire transmits a driving force, a braking force, and a lateral force of a vehicle to a road surface while supporting a load of the vehicle against the road surface, and has a spring and damper function that alleviates an impact on the road surface. When an inflation pressure of the vehicle tire is too high or too low, there is a possibility that the tire may burst or the vehicle slips easily, leading to a major accident, and furthermore, fuel consumption is increased, which deteriorates fuel economy, shortens tire life, and reduces ride comfort and braking power. Accordingly, a driver must continuously determine whether a pressure of the tire is abnormal, and when there is an abnormality, the tire must be replaced.

To the present end, a vehicle provided with a tire pressure detection function detects whether the tire has a low pressure through a sensor that detects the pressure of the tire, and then informs a user of it. On the other hand, in the case of a vehicle without a pressure sensor attached to the tire, it is indirectly determined whether the tire has a low pressure according to a speed of each wheel measured by a wheel speed sensor of each wheel.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a vehicle control apparatus configured for determining an air pressure state of a tire even when a failure of at least one wheel speed sensor occurs.

The technical objects of the exemplary embodiments included in the present specification are not limited to the objects mentioned above, and other technical objects not mentioned may be clearly understood by those skilled in the art from the description of the claims.

An exemplary embodiment included in the present specification provides a vehicle control apparatus including: an information acquisition device configured to acquire information related to at least one motor in a vehicle and information related to a plurality of wheel speed sensors; a calculator configured to determine an estimated wheel speed value according to the information related to the at least one motor and the information related to the wheel speed sensors; and a controller configured to determine an air pressure state of a tire corresponding to each of the wheel speed sensors of the vehicle according to the estimated wheel speed value and the information related to the wheel speed sensors.

In various exemplary embodiments of the present invention, the information related to the at least one motor may include a number of revolutions per minute of the at least one motor, and the information related to the wheel speed sensors may include failure information of the wheel speed sensors and wheel speed values measured by the wheel speed sensors.

In various exemplary embodiments of the present invention, the at least one motor may include at least one of a first motor connected to front wheels of the vehicle and a second motor connected to rear wheels of the vehicle, and the wheel speed sensors may include a first wheel speed sensor and a second wheel speed sensor engaged to the front wheels of the vehicle, and a third wheel speed sensor and a fourth wheel speed sensor engaged to the rear wheels of the vehicle.

In various exemplary embodiments of the present invention, the calculator may determine a first estimated wheel speed value of the first wheel speed sensor according to a number of revolutions per minute of the first motor and a wheel speed value measured by the second wheel speed sensor when the first wheel speed sensor fails, and the calculator may determine a second estimated wheel speed value of the second wheel speed sensor according to a number of revolutions per minute of the first motor and a wheel speed value measured by the first wheel speed sensor when the second wheel speed sensor fails.

In various exemplary embodiments of the present invention, the calculator may determine a first estimated wheel speed value of the first wheel speed sensor and a second estimated wheel speed value of the second wheel speed sensor according to a number of revolutions per minute of the first motor when the first wheel speed sensor and the second wheel speed sensor fail.

In various exemplary embodiments of the present invention, the calculator may determine a third estimated wheel speed value of the third wheel speed sensor according to a number of revolutions per minute of the second motor and a wheel speed value measured the fourth wheel speed sensor when the third wheel speed sensor fails. The calculator may determine a fourth estimated wheel speed value of the fourth wheel speed sensor according to the number of revolutions per minute of the second motor and a wheel speed value measured by the third wheel speed sensor when the fourth wheel speed sensor fails.

In various exemplary embodiments of the present invention, the calculator may determine a third estimated wheel speed value of the third wheel speed sensor and a fourth estimated wheel speed value of the fourth wheel speed sensor according to a number of revolutions per minute of the second motor when the third wheel speed sensor and the fourth wheel speed sensor fail.

In various exemplary embodiments of the present invention, the information related to the wheel speed sensors may include wheel speed values measured by the wheel speed sensors and resonant frequency values measured by the wheel speed sensors, and the controller may be configured to determine effective rolling radii of the tires according to the wheel speed values measured by the wheel speed sensors and the estimated wheel speed value, and may determine whether the tires have a low pressure according to the resonance frequency values measured by the wheel speed sensors and the effective rolling radii of the tires.

In various exemplary embodiments of the present invention, it may further include an output device configured to output information related to whether at least one of the tires has a low pressure when it is determined that the at least one tire has the low pressure.

An exemplary embodiment included in the present specification provides an operating method of a vehicle control apparatus, including: acquiring information related to at least one motor in a vehicle; acquiring information related to a plurality of wheel speed sensors in the vehicle; determining an estimated wheel speed value according to the information related to at least one motor and the information related to the wheel speed sensors; and determining an air pressure state of a tire corresponding to each of the wheel speed sensors based on the estimated wheel speed value and the information related to the wheel speed sensors.

In various exemplary embodiments of the present invention, the information related to the at least one motor may include a number of revolutions per minute of the at least one motor, and the information related to the wheel speed sensors may include failure information of the wheel speed sensors and wheel speed values measured by the wheel speed sensors.

In various exemplary embodiments of the present invention, the at least one motor may include at least one of a first motor connected to front wheels of the vehicle and a second motor connected to rear wheels of the vehicle, and the wheel speed sensors may include a first wheel speed sensor and a second wheel speed sensor engaged to the front wheels of the vehicle, and a third wheel speed sensor and a fourth wheel speed sensor engaged to the rear wheels of the vehicle.

In various exemplary embodiments of the present invention, the determining of the estimated wheel speed value according to the information related to the at least one motor and the information related to the wheel speed sensors may include: determining a first estimated wheel speed value of the first wheel speed sensor according to a number of revolutions per minute of the first motor and a wheel speed value measured by the second wheel speed sensor when the first wheel speed sensor fails; and determining a second estimated wheel speed value of the second wheel speed sensor according to a number of revolutions per minute of the first motor and a wheel speed value measured by the first wheel speed sensor when the second wheel speed sensor fails.

In various exemplary embodiments of the present invention, the determining of the estimated wheel speed value according to the information related to the at least one motor and the information related to the wheel speed sensors may include determining a first estimated wheel speed value of the first wheel speed sensor and a second estimated wheel speed value of the second wheel speed sensor according to a number of revolutions per minute of the first motor when the first wheel speed sensor and the second wheel speed sensor fail.

In various exemplary embodiments of the present invention, the determining of the estimated wheel speed value according to the information related to the at least one motor and the information related to the wheel speed sensors may include: determining a third estimated wheel speed value of the third wheel speed sensor according to a number of revolutions per minute of the second motor and a wheel speed value measured the fourth wheel speed sensor when the third wheel speed sensor fails; and determining a fourth estimated wheel speed value of the fourth wheel speed sensor according to the number of revolutions per minute of the second motor and a wheel speed value measured by the third wheel speed sensor when the fourth wheel speed sensor fails.

In various exemplary embodiments of the present invention, the determining of the estimated wheel speed value according to the information related to the at least one motor and the information related to the wheel speed sensors may include determining a third estimated wheel speed value of the third wheel speed sensor and a fourth estimated wheel speed value of the fourth wheel speed sensor according to a number of revolutions per minute of the second motor when the third wheel speed sensor and the fourth wheel speed sensor fail.

In various exemplary embodiments of the present invention, the information related to the wheel speed sensors my include wheel speed values measured by the wheel speed sensors and resonant frequency values measured by the wheel speed sensors, and the determining the air pressure state of the tire corresponding to each of the wheel speed sensors based on the estimated wheel speed value and the information related to the wheel speed sensors may include: determining effective rolling radii of the tires according to the wheel speed values measured by the wheel speed sensors and the estimated wheel speed value; and determining whether the tires have a low pressure according to the resonance frequency values measured by the wheel speed sensors and the effective rolling radii of the tires.

An exemplary embodiment included in the present specification provides a vehicle including: a plurality of wheels; a plurality of wheel speed sensors for measuring information related to the wheels; and a controller configured to acquire information related to the wheel speed sensors and to acquire information related to the at least one motor, to determine estimated wheel speed values of the wheels based on the information related to the wheel speed sensors and the information related to the at least one motor, and to determine an air pressure state of a tire corresponding to each of the wheel speed sensors according to the estimated wheel speed values and the information related to the wheel speed sensors.

In various exemplary embodiments of the present invention, the information related to the wheel speed sensors may include whether the wheel speed sensors fail and wheel speed values of the wheels measured by the wheel speed sensors, and the information related to the at least one motor may include a number of revolutions per minute of the at least one motor.

In various exemplary embodiments of the present invention, the wheels may include a first wheel, a second wheel, a third wheel, and a fourth wheel, the wheel speed sensors may include a first wheel speed sensor that measures information related to the first wheel, a second wheel speed sensor that measures information related to the second wheel, a third wheel speed sensor that measures information related to the third wheel, and a fourth wheel speed sensor that measures information related to a fourth wheel, and the at least one motor may include at least one of a first motor connected to the first wheel and the second wheel, and a second motor connected to the third wheel and the fourth wheel.

The vehicle control apparatus according to an exemplary embodiment included in the present specification may estimate a wheel speed value of a defective wheel speed sensor when a failure of at least one wheel speed sensor occurs, and may determine whether or not the tires of the vehicle have a low pressure based on the estimated wheel speed value.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
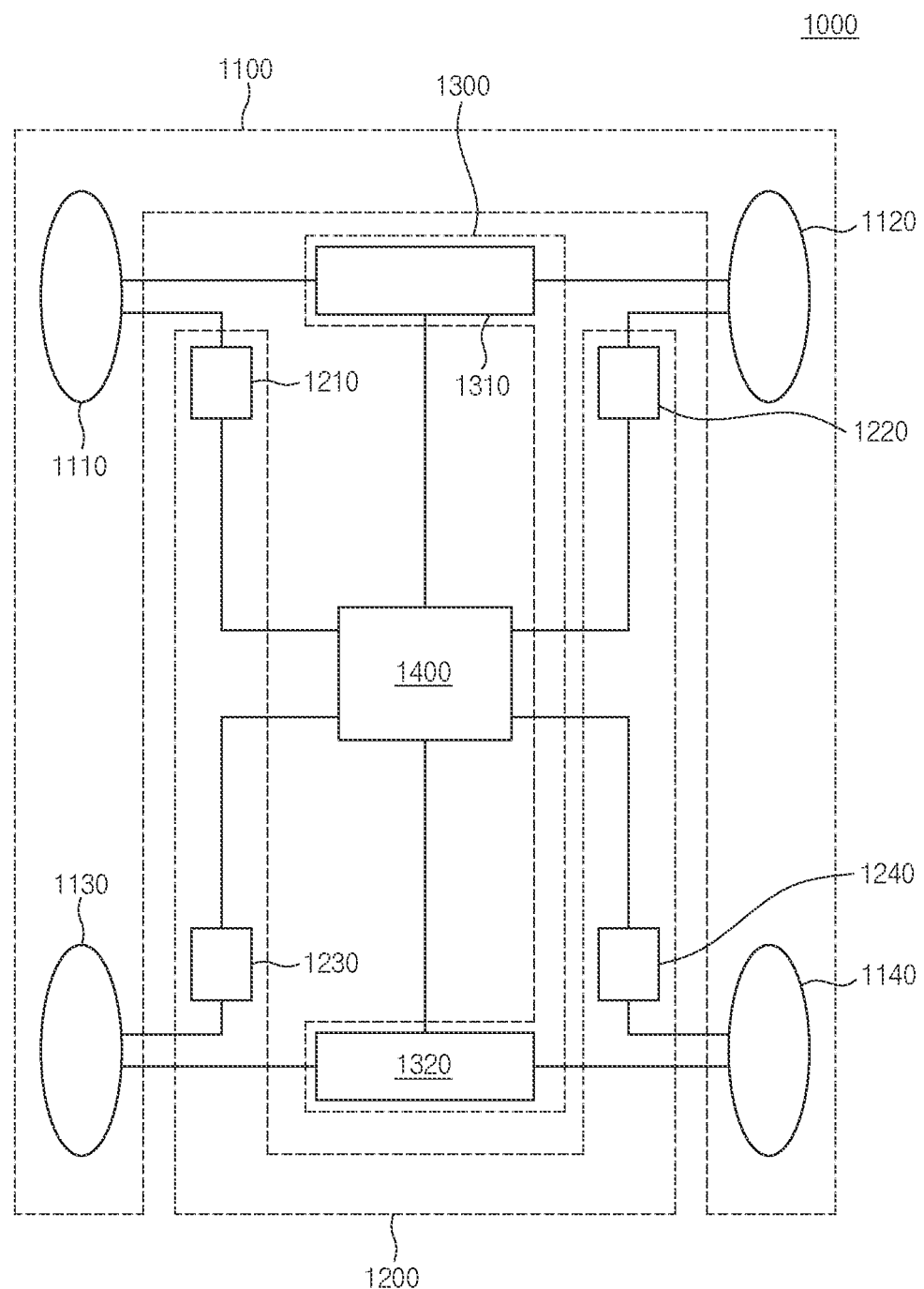
FIG. 1 illustrates a vehicle according to an exemplary embodiment included in the present specification.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, some exemplary embodiments disclosed in the present specification will be described in detail with reference to exemplary drawings. It should be noted that in adding reference numerals to constituent elements of each drawing, the same constituent elements have the same reference numerals as possible even though they are indicated on different drawings. In describing exemplary embodiments disclosed in the present specification, when it is determined that a detailed description of the well-known configuration or function associated with the present invention may obscure the gist of the present invention, it will be omitted.

In describing constituent elements according to an exemplary embodiment disclosed in the present specification, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the Field of the Invention to which exemplary embodiments disclosed in the present specification pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

FIG. 1 illustrates a vehicle according to an exemplary embodiment included in the present specification.

Referring to FIG. 1, a vehicle 1000 according to an exemplary embodiment included in the present specification may include a plurality of wheels 1100, a plurality of wheel speed sensors 1200, a plurality of motors 1300, and a controller 1400.

The wheels 1100 may include a first wheel 1110, a second wheel 1120, a third wheel 1130, and a fourth wheel 1140. For example, the first wheel 1110 may be positioned at a left side of front wheels of the vehicle 1000, the second wheel 1120 may be positioned at a right side of the front wheels of the vehicle 1000, the third wheel 1130 may be positioned at a left of rear wheels of the vehicle 1000, and the fourth wheel 1140 may be positioned at a right side of the rear wheels of the vehicle 1000. However, the exemplary embodiment included in the present specification is not limited thereto, and the wheels 1100 may include a smaller number or a larger number of wheels.

The wheel speed sensors 1200 may measure speeds of the wheels 1100. For example, the wheel speed sensors 1200 may include a first wheel speed sensor 1210, a second wheel speed sensor 1220, a third wheel speed sensor 1230, and a fourth wheel speed sensor 1240. The first wheel speed sensor 1210, the second wheel speed sensor 1220, the third wheel speed sensor 1230, and the fourth wheel speed sensor 1240 may measure the speeds of the corresponding first wheel 1110, second wheel 1120, third wheel 1130, and fourth wheel 1140, respectively.

The motors 1300 may be connected to the wheels 1100. For example, the motors 1300 may include a first motor 1310 and a second motor 1320. The first motor 1310 may be connected to the first wheel 1110 and the second wheel 1120 positioned on the front wheel of the vehicle 1000, and the second motor 1320 may be connected to the third wheel 1130 and the fourth wheel 1140 positioned on the rear wheel of the vehicle 1000.

The controller 1400 may be connected to the wheel speed sensors 1200 and the motors 1300. For example, the controller 1400 may be connected to the first wheel speed sensor 1210, the second wheel speed sensor 1220, the third wheel speed sensor 1230, the fourth wheel speed sensor 1240, the first motor 1310, and the second motor 1320, or may be connected thereto at once.

The controller 1400 may obtain information related to each of the wheel speed sensors 1200 from the wheel speed sensors 1200, and may obtain information related to each of the motors 1300 from the motors 1300. For example, the information related to the wheel speed sensors 1200 includes information related to whether the wheel speed sensors 1200 fail, and wheel speeds of the wheels 1100 measured by the wheel speed sensors 1200. Furthermore, the information related to the motors 1300 may include the number of revolutions per minute of the motors 1300.

The controller 1400 may determine estimated wheel speed values of the wheels 1100 based on information related to the wheel speed sensors 1200 and information related to the motors 1300. When any one of the wheel speed sensors 1200 has a failure, the controller 1400 may determine an estimated wheel speed value of a defective wheel speed sensor based on the number of revolutions per minute of any one of the motors 1300 and the wheel speed values measured by other wheel speed sensors excluding the defective wheel speed sensor.

The controller 1400 may determine an air pressure state of tires corresponding to each of the wheel speed sensors based on the information related to the wheel speed sensors 1200 and the determined estimated wheel speed value. For example, the controller 1400 may determine the air pressure state of the tire corresponding to the defective wheel speed sensor based on the determined estimated wheel speed value, and in the case of a wheel speed sensor which is not a malfunction, may determine the air pressure state of the tire corresponding to the non-failure wheel speed sensor by use of the wheel speed value of the wheel measured by the wheel speed sensor which does not fail.

The controller 1400 may determine whether at least one tire has a low pressure among a first tire coupled to the first wheel 1110 corresponding to the first wheel speed sensor 1210, a second tire coupled to the second wheel 1120 corresponding to the second wheel speed sensor 1220, a third tire coupled to the third wheel 1130 corresponding to the third wheel speed sensor 1230, and a fourth tire coupled to the fourth wheel 1140 corresponding to the fourth wheel speed sensor 1240.

The vehicle 1000 may determine the air pressure state of at least one tire through execution of the operation of the controller 1400 that has obtained information from at least one of the wheels 1100, the wheel speed sensors 1200, and the motors 1300

That is, the vehicle 1000 may inform a user of whether or not the at least one tire has a low pressure, and may help the user to prevent an accident caused by the low pressure of the tire when it is determined that the air pressure of at least one tire is low and it is determined that the air pressure of at least one tire is low.

In an exemplary embodiment of the present invention, the at least one tire has a low pressure when the pressure in the at least one tire is lower than a predetermined pressure.

Hereinafter, a vehicle control apparatus 100 according to an exemplary embodiment included in the present specification will be described in detail with reference to FIG. 2.

Figure 2:
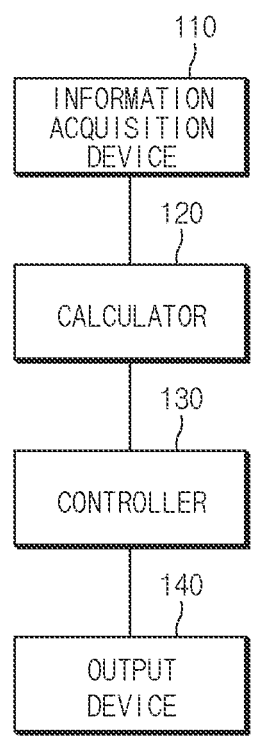
FIG. 2 illustrates a vehicle control apparatus according to an exemplary embodiment included in the present specification.

FIG. 2 illustrates a vehicle control apparatus according to an exemplary embodiment included in the present specification.

Referring to FIG. 2, the vehicle control apparatus 100 according to an exemplary embodiment included in the present specification may include an information acquisition device 110, a calculator 120, a controller 130, and an output device 140.

The vehicle control apparatus 100 and the controller 1400 in FIG. 1 may be substantially the same.

The information acquisition device 110 may acquire information related to the motors 1300 in the vehicle 1000 and information related to the wheel speed sensors 1200. For example, the information related to the motors 1300 may include the number of revolutions per minute of the motors 1300, and the information related to the wheel speed sensors 1200 may include failure information of the wheel speed sensors 1200 and wheel speed values measured by the wheel speed sensors 1200.

The motors 1300 may include at least one of a first motor 1310 and a second motor 1320. Furthermore, the wheel speed sensors 1200 may include a first wheel speed sensor 1210 and a second wheel speed sensor 1220 connected to the front wheels of the vehicle 1000, and a third wheel speed sensor 1230 and a fourth wheel speed sensor 1240 connected to the rear wheels of the vehicle 1000. That is, the information acquisition device 110 may acquire information related to the first motor 1310, the second motor 1320, the first wheel speed sensor 1210, the second wheel speed sensor 1220, the third wheel speed sensor 1230.

In the instant case, the information acquisition device 110 may determine that at least one of the wheel speed sensors 1200 has a failure when an abnormality is detected by checking a communication timer, an alive counter value, and a cyclic redundancy check (CRC) result from the wheel speed sensors 1200, when the wheel speed value obtained by the wheel speed sensors 1200 is out of a normal range, or when the connection with the wheel speed sensors 1200 is short-circuited to obtain no wheel speed value. Accordingly, the information acquisition device 110 may acquire failure information of the wheel speed sensors 1200.

The calculator 120 may determine an estimated wheel speed value based on information related to the motors 1300 and information related to the wheel speed sensors 1200. For example, the calculator 120 may determine an estimated wheel speed value of the defective wheel speed sensor based on the number of revolutions per minute of the motors 1300, failure information of the plurality of wheel speed sensors 1200, and the wheel speed value measured by the at least one wheel speed sensor 1200.

When the first wheel speed sensor 1210 fails, the calculator 120 may determine a first estimated wheel speed value of the first wheel speed sensor 1210. For example, the calculator 120 may determine the first estimated wheel speed value based on the number of revolutions per minute of the first motor 1310 and a wheel speed value measured by the second wheel speed sensor 1220. The calculator 120 may determine the first estimated wheel speed value by subtracting the wheel speed value measured by the second wheel speed sensor 1220 from a value obtained by multiplying the revolutions per minute of the first motor 1310 by a constant multiple.

When the second wheel speed sensor 1220 has failed, the calculator 120 may determine a second estimated wheel speed value of the second wheel speed sensor 1220. For example, the calculator 120 may determine the second estimated wheel speed value based on the number of revolutions per minute of the first motor 1310 and a wheel speed value measured by the first wheel speed sensor 1210. The calculator 120 may determine the second estimated wheel speed value by subtracting the wheel speed value measured by the first wheel speed sensor 1210 from a value obtained by multiplying the revolutions per minute of the first motor 1310 by a constant multiple.

When both the first wheel speed sensor 1210 and the second wheel speed sensor 1220 have failed, the calculator 120 may determine the first estimated wheel speed value and the second estimated wheel speed value based on the number of revolutions per minute of the first motor 1310. For example, the calculator 120 may assume that the first estimated wheel speed value and the second estimated wheel speed value have the same value, and accordingly, may determine the first estimated wheel speed value and the second estimated wheel speed value by multiplying the number of revolutions per minute of the first motor 1310 by a constant multiple.

When the third wheel speed sensor 1230 has failed, the calculator 120 may determine a third estimated wheel speed value of the third wheel speed sensor 1230. For example, the calculator 120 may determine the third estimated wheel speed value based on the number of revolutions per minute of the second motor 1320 and a wheel speed value measured by the fourth wheel speed sensor 1240. The calculator 120 may determine the third estimated wheel speed value by subtracting the wheel speed value measured by the fourth wheel speed sensor 1240 from a value obtained by multiplying the revolutions per minute of the second motor 1320 by a constant multiple.

When the fourth wheel speed sensor 1240 has failed, the calculator 120 may determine a fourth estimated wheel speed value of the fourth wheel speed sensor 1240. For example, the calculator 120 may determine the fourth estimated wheel speed value based on the number of revolutions per minute of the second motor 1320 and a wheel speed value measured by the third wheel speed sensor 1230. The calculator 120 may determine the fourth estimated wheel speed value by subtracting the wheel speed value measured by the third wheel speed sensor 1230 from a value obtained by multiplying the revolutions per minute of the second motor 1320 by a constant multiple.

When both the third wheel speed sensor 1230 and the fourth wheel speed sensor 1240 have failed, the calculator 120 may determine the third estimated wheel speed value and the fourth estimated wheel speed value based on the number of revolutions per minute of the second motor 1320. For example, the calculator 120 may assume that the third estimated wheel speed value and the fourth estimated wheel speed value have the same value, and accordingly, may determine the third estimated wheel speed value and the fourth estimated wheel speed value by multiplying the number of revolutions per minute of the second motor 1320 by a constant multiple.

In an exemplary embodiment of the present invention, the controller 130 may include functions of the calculator 120.

Hereinafter, accuracy of the estimated wheel speed value determined by the calculator 130 will be described with reference to FIG. 3 to FIG. 5.

Figure 3:
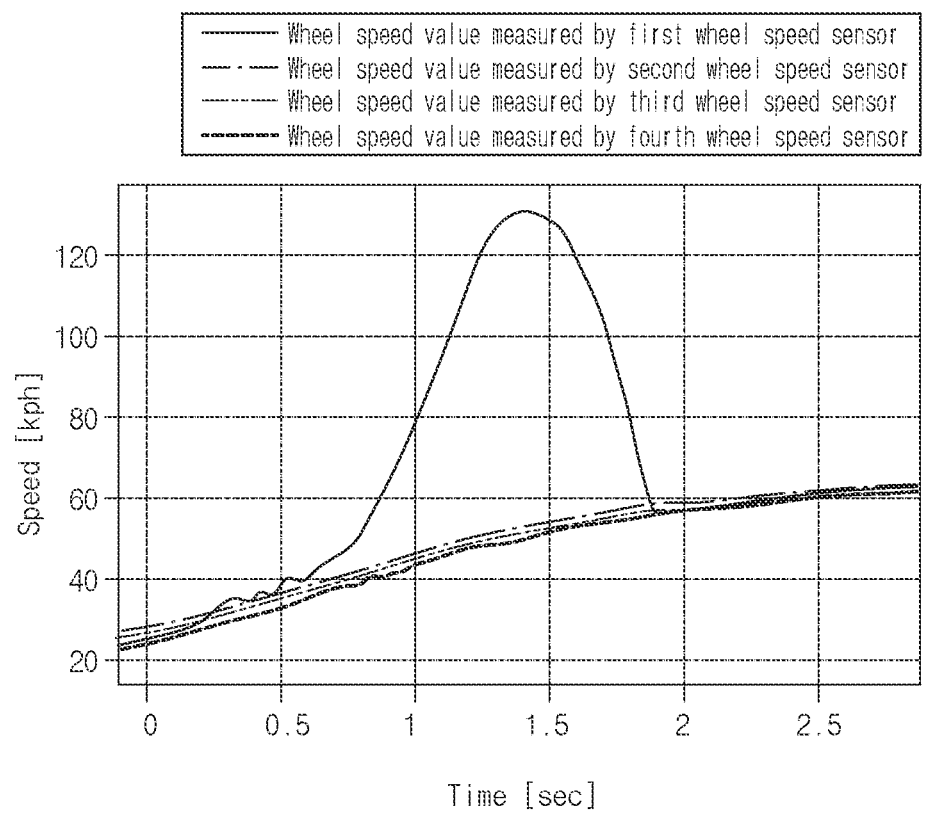
FIG. 3 illustrates a graph showing wheel speed values measured by a plurality of wheel speed sensors according to an exemplary embodiment included in the present specification.

FIG. 3 illustrates a graph showing wheel speed values measured by a plurality of wheel speed sensors according to an exemplary embodiment included in the present specification.

Figure 4:
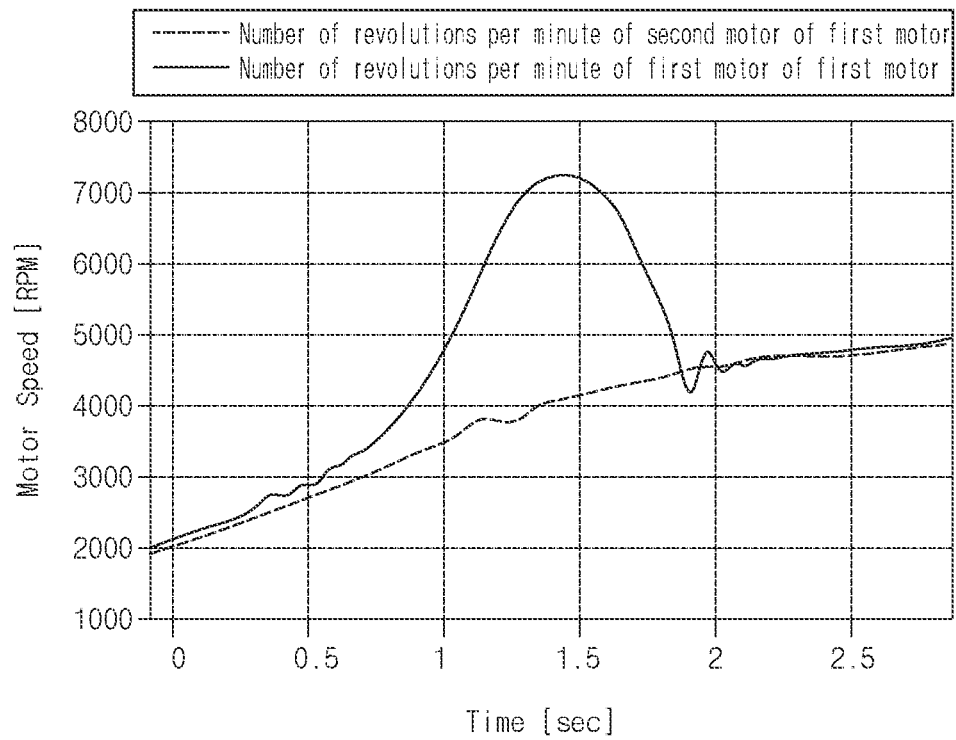
FIG. 4 illustrates a graph showing a number of revolutions per minute of a plurality of motors according to an exemplary embodiment included in the present specification.

FIG. 4 illustrates a graph showing a number of revolutions per minute of a plurality of motors according to an exemplary embodiment included in the present specification.

Figure 5:
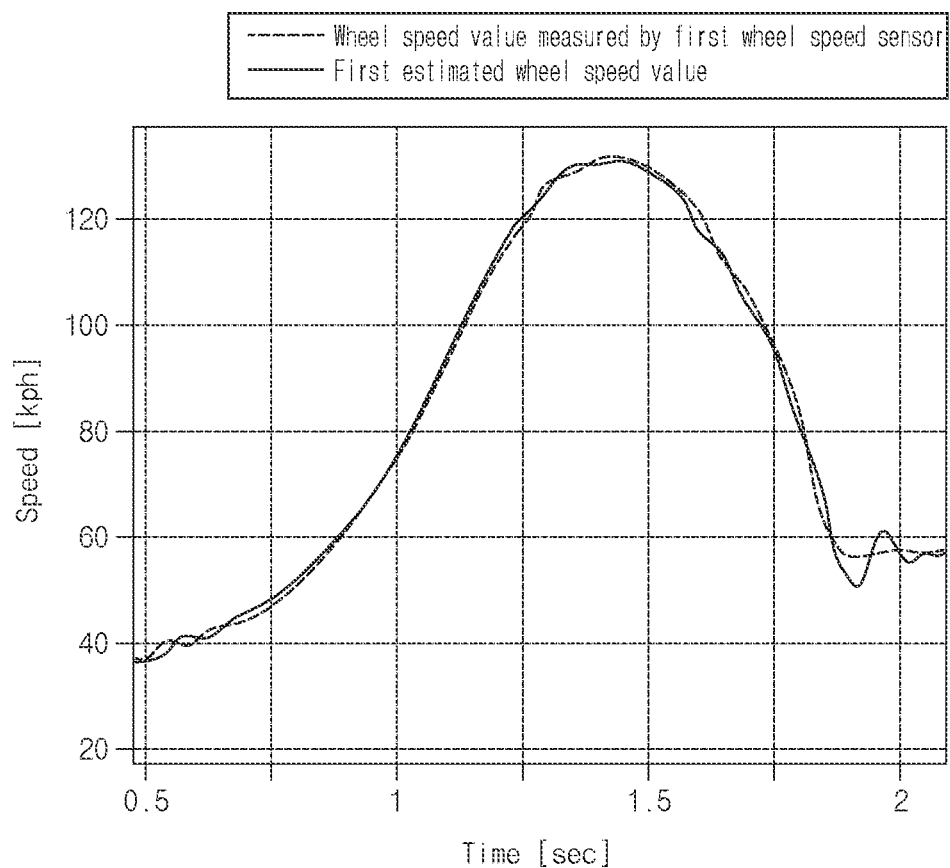
FIG. 5 illustrates a graph showing a comparison of an estimated wheel speed value and a wheel speed value measured by a wheel speed sensor according to an exemplary embodiment included in the present specification.

FIG. 5 illustrates a graph showing a comparison of an estimated wheel speed value and a wheel speed value measured by a wheel speed sensor according to an exemplary embodiment included in the present specification.

Referring to FIG. 5, it may be seen that the wheel speed value measured by the second wheel speed sensor 1220, the wheel speed value measured by the third wheel speed sensor 1230, and the wheel speed value measured by the fourth wheel speed sensor 1240 differ not much from each other, while it may be seen that the wheel speed value measured by the first wheel speed sensor 1210 connected to the first wheel 1110 changes with a large difference.

Referring to FIG. 4, it may be seen that the number of revolutions per minute of the first motor 1310 connected to the first wheel 1110 and the second wheel 1120 varies greatly from the number of revolutions per minute of the second motor 1320 connected to the third wheel 1130 and the fourth wheel 1140.

Referring to FIG. 5, it may be seen that there is no significant difference between the first estimated wheel speed value determined based on the number of revolutions per minute of the first motor 1310 and the wheel speed value measured by the second wheel speed sensor 1220 and the wheel speed value measured by the first wheel speed sensor 1210. That is, the first estimated wheel speed value determined by the calculator 120 may be similar to the wheel speed value measured by the first wheel speed sensor 1210 with high accuracy.

In FIG. 3 to FIG. 5, only the first estimated wheel speed value determined by the calculator 120 is illustrated, and the accuracy of the first estimated wheel speed value is illustrated, but the present specification is not limited thereto. That is, the calculator 120 may accurately determine all of the second estimated wheel speed value, the third estimated wheel speed value, and the fourth estimated wheel speed value.

Referring back to FIG. 2, the controller 130 may determine an air pressure state of a tire corresponding to each of the wheel speed sensors 1200 of the vehicle 1000 based on the estimated wheel speed value determined by the calculator 120 and information related to the wheel speed sensors 1200.

In the case of a defective wheel speed sensor, the controller 130 may replace the wheel speed value of the wheel measured by the defective wheel speed sensor with the estimated wheel speed value determined by the calculator 120 based on failure information of the wheel speed sensors 1200. For example, the controller 130 may replace the wheel speed value of the first wheel 1110 with the first estimated wheel speed value when the first wheel speed sensor 1210 fails, may replace the wheel speed value of the second wheel 1120 with the second estimated wheel speed value when the second wheel speed sensor 1220 fails, may replace the wheel speed value of the third wheel 1130 with the third estimated wheel speed value when the third wheel speed sensor 1230 fails, and may replace the wheel speed value of the fourth wheel 1140 with the fourth estimated wheel speed value when the fourth wheel speed sensor 1240 fails.

The controller 130 may determine an air pressure state of a tire corresponding to each of the wheel speed sensors 1200 based on the estimated wheel speed values and the wheel speed values measured by the wheel speed sensors 1200. For example, when it is determined that the wheel speed value of the at least one wheel increases than the reference value, the controller 130 may determine that the air pressure of the tire coupled to the at least one wheel is low.

The controller 130 may perform a front-to-back comparison comparing a sum of the speed values of the first wheel 1110 and the speed values of the second wheel 1120 with a sum of the speed values of the third wheel 1130 and the speed values of the fourth wheel 1140. Furthermore, the controller 130 may perform a left and right comparison comparing a sum of the speed values of the first wheel 1110 and the speed values of the third wheel 1130 with a sum of the speed values of the second wheel 1120 and the speed values of the fourth wheel 1140. The controller 130 may also perform a diagonal comparison comparing a sum of the speed values of the first wheel 1110 and the speed values of the fourth wheel 1140 with a sum of the speed values of the second wheel 1120 and the speed values of the third wheel 1130. That is, the controller 130 may determine whether the tires corresponding to the wheel speed sensors 1200 has a low pressure through the front-to-back comparison, the left and right comparison, and the diagonal comparison.

Meanwhile, the controller 130 may determine whether the tires have a low pressure based on the information related to wheel speed sensors 1200 and the estimated wheel speed values. For example, the information related to the wheel speed sensors 1200 may include resonance frequency values and wheel speed values measured by the wheel speed sensors 1200. The controller 130 may determine an effective rolling radius of a corresponding tire based on the estimated wheel speed values in the case of the defective wheel speed sensor, and may determine an effective rolling radius of a corresponding tire based on the measured wheel speed value in the case of the non-defective wheel speed sensor. The controller 130 may receive resonant frequency values of tires obtained by the information acquisition device 110. The controller 130 may determine whether the tires have a low pressure by comparing effective rolling radii and resonance frequency values of the tires with effective rolling radii and resonance frequency values of the tires having a predetermined normal pressure.

Meanwhile, the wheel speed sensors 1200 may measure resonant frequency values of the tires by detecting pulse waves of tone wheels coupled to the wheels 1100, and performing Fourier transform on the pulse waves. Furthermore, the information acquisition device 110 may acquire a resonant frequency value when at least one of the wheel speed sensors 1200 is not defective. That is, when all of the wheel speed sensors 1200 are defective, the information acquisition device 110 may not be able to obtain a resonant frequency value.

When it is determined that at least one of the tires has a low pressure, the output device 140 may output information related to whether the at least one tire has a low pressure. For example, when it is determined whether a tire has a low pressure and a position of a low-pressure tire is determined, the output device 140 may output whether the tire has a low pressure and the position of the low-pressure tire. The output device 140 may output information related to whether the tire has a low pressure when only the low pressure is determined while the position of the low pressure tire is not determined. Furthermore, when at least one of the wheel speed sensors 1200 has a failure, and it is not possible to determine whether the tire has a low pressure due to the failure, the output device 140 may output failure information of a low pressure detection device of the tire. That is, the output device 140 may inform a user of the contents of the low pressure of the tire or the contents of the failure of the low pressure detection device, and the user may repair the vehicle based on the informed contents, and thus accidents caused by the low pressure of the tire may be prevented in advance.

In conclusion, the vehicle control apparatus 100 according to the exemplary embodiment included in the present specification may obtain the number of revolutions per minute of the motors 1300 and failure information of the wheel speed sensors 1200 from the information acquisition device 110 and the wheel speed values measured by the wheel speed sensors 1200, and may determine estimated wheel speed values of the failed wheel speed sensors based on the number of revolutions per minute of the motors 1300 from the calculator 120, failure information of the wheel speed sensors 1200, and wheel speed values measured by the wheel speed sensors 1200. The vehicle control apparatus 100 may determine whether a tire corresponding to each of the plurality of wheel speed sensors 1200 has a low pressure based on the wheel speed value estimated by the controller 130 and the wheel speed value and the resonance frequency value measured by the wheel speed sensors that are not defective, and may output information related to whether or not the tire has a low pressure to report it to the user. That is, the vehicle control apparatus 100 may determine whether the tire has a low pressure to report it to the user, and the user may be notified whether the tire has a low pressure and prevent an accident in the vehicle due to the low pressure of the tire.

Hereinafter, other exemplary embodiments included in the present specification will be described with reference to FIG. 6 and FIG. 7.

Figure 6:
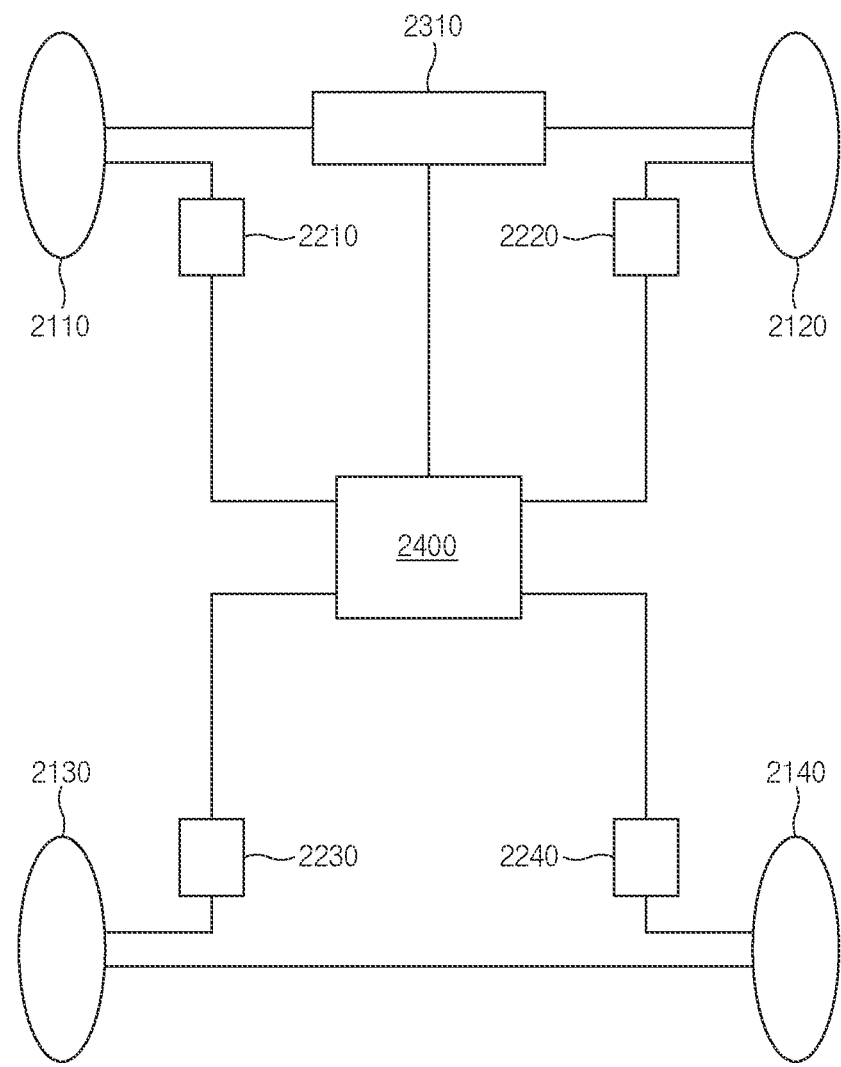
FIG. 6 illustrates a vehicle according to another exemplary embodiment included in the present specification.

FIG. 6 illustrates a vehicle according to another exemplary embodiment included in the present specification.

Referring to FIG. 6, the vehicle 2000 according to another exemplary embodiment included in the present specification may include a first wheel 2110, a second wheel 2120, a third wheel 2130, a fourth wheel 2140, a first wheel speed sensor 2210, a second wheel speed sensor 2220, a third wheel speed sensor 2230, a fourth wheel speed sensor 2240, a first motor 2310, and a controller 2400.

Referring to FIG. 1, the first wheel 2110, the second wheel 2120, the third wheel 2130, and the fourth wheel 2140 may be respectively substantially the same as the first wheel 1110, the second wheel 1120, the third wheel 1130, and the fourth wheel 1140 in FIG. 1.

Referring to FIG. 1, the first wheel speed sensor 2210, the second wheel speed sensor 2220, the third wheel speed sensor 2230, and the fourth wheel speed sensor 2240 may be substantially the same as the sensor 1210, the second wheel speed sensor 1220, the third wheel speed sensor 1230, and the fourth wheel speed sensor 1240 in FIG. 1.

Referring to FIG. 1, the first motor 2310 may be substantially the same as the first motor 1310 in FIG. 1.

The controller 2400 may be connected to the first wheel speed sensor 2210, the second wheel speed sensor 2220, the third wheel speed sensor 2230, the fourth wheel speed sensor 2240, and the first motor 2310, and may obtain information from the first wheel speed sensor 2210, the second wheel speed sensor 2220, the third wheel speed sensor 2230, the fourth wheel speed sensor 2240, and the first motor 2310.

When the first wheel speed sensor 2210 fails, the controller 2400 may determine a first estimated wheel speed value of the first wheel speed sensor 2210 based on the number of revolutions per minute of the first motor 2310 and the wheel speed value measured by the second wheel speed sensor 2220. Furthermore, when the second wheel speed sensor 2220 fails, the controller 2400 may determine a second estimated wheel speed value of the second wheel speed sensor 2220 based on the number of revolutions per minute of the first motor 2310 and the wheel speed value measured by the first wheel speed sensor 2210.

When both the first wheel speed sensor 2210 and the second wheel speed sensor 2220 fail, the controller 2400 may determine the first estimated wheel speed value and the second estimated wheel speed value based on the number of revolutions per minute of the first motor 2310.

The controller 2400 may determine effective rolling radii of tires coupled to the first wheel 2110, the second wheel 2120, the third wheel 2130, and the fourth wheel 2140 based on estimated wheel speed values and the wheel speed values measured by the first wheel speed sensor 2210, the second wheel speed sensor 2220, the third wheel speed sensor 2230, and the fourth wheel speed sensor 2240. The controller 2400 may determine conditions of the tires based on the determined effective rolling radii and resonance frequency values of the tires. For example, the controller 2400 may determine whether the tires have low pressure through the above-described front-to-back comparison, diagonal comparison, and left and right comparison, and may output information related to whether the tires have a low pressure to the user.

On the other hand, when the third wheel speed sensor 2230 and the fourth wheel speed sensor 2240 fail, no motor is connected to the third wheel speed sensor 2230 and the fourth wheel speed sensor 2240, the controller 2400 may determine no estimated wheel speed value. That is, the controller 2400 may not be able to detect the low pressure of tires when the third wheel speed sensor 2230 and the fourth wheel speed sensor 2240 fail. Accordingly, when the third wheel speed sensor 2230 or the fourth wheel speed sensor 2240 fails, the controller 2400 may output a failure of the low pressure detection device of the tire.

That is, the vehicle 2000 according to another exemplary embodiment included in the present specification may determine whether or not the tire has a low pressure with more limited performance than the vehicle 1000 in FIG. 1.

Figure 7:
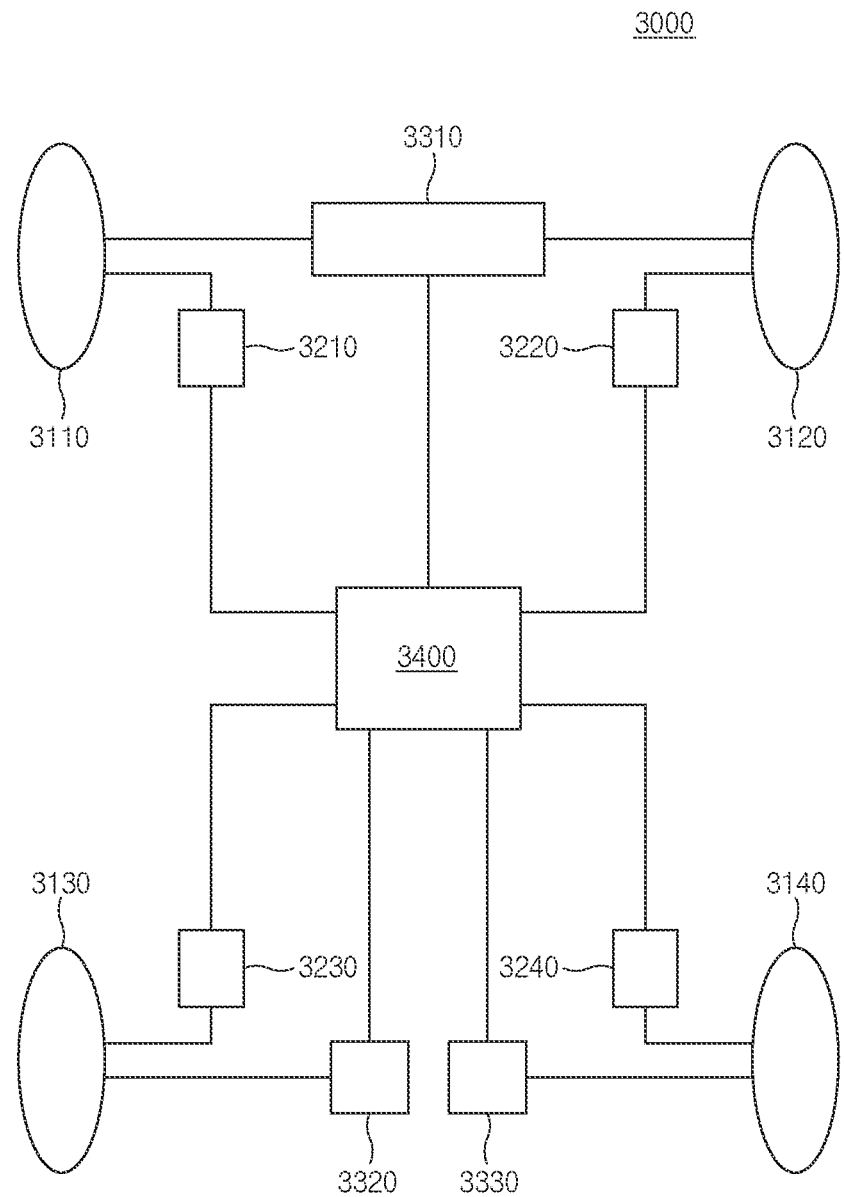
FIG. 7 illustrates a vehicle according to various exemplary embodiments included in the present specification.

FIG. 7 illustrates a vehicle according to various exemplary embodiments included in the present specification.

Referring to FIG. 7, the vehicle 3000 according to various exemplary embodiments included in the present specification may include a first wheel 3110, a second wheel 3120, a third wheel 3130, a fourth wheel 3140, a first wheel speed sensor 3210, a second wheel speed sensor 3220, a third wheel speed sensor 3230, a fourth wheel speed sensor 3240, a first motor 3310, a second motor 3320, a third motor 3330, and a controller 2400.

Referring to FIG. 1, the first wheel 3110, the second wheel 3120, the third wheel 3130, and the fourth wheel 3140 may be respectively substantially the same as the first wheel 1110, the second wheel 1120, the third wheel 1130, and the fourth wheel 1140 in FIG. 1.

Referring to FIG. 1, the first wheel speed sensor 3210, the second wheel speed sensor 3220, the third wheel speed sensor 3230, and the fourth wheel speed sensor 3240 may be substantially the same as the sensor 1210, the second wheel speed sensor 1220, the third wheel speed sensor 1230, and the fourth wheel speed sensor 1240 in FIG. 1.

The first motor 3310 may be connected to the first wheel speed sensor 3210 and the second wheel speed sensor 3220. The second motor 3320 may be connected to the third wheel speed sensor 3230. The third motor 3330 may be connected to the fourth wheel speed sensor 3240.

The controller 3400 may be connected to the first wheel speed sensor 3210, the second wheel speed sensor 3220, the third wheel speed sensor 3230, the fourth wheel speed sensor 3240, the first motor 3310, the second motor 3320, and the third motor 3330. The controller 3400 may obtain information from the first wheel speed sensor 3210, the second wheel speed sensor 3220, the third wheel speed sensor 3230, the fourth wheel speed sensor 3240, the first motor 3310, the second motor 3320, and the third motor 3330.

The controller 3400 may determine a first estimated wheel speed value when the first wheel speed sensor 3210 fails, and may determine a second estimated wheel speed value when the second wheel speed sensor 3220 fails. In the instant case, a method of determining the estimated wheel speed value may be the same as the method in which the controller 1400 determines the first estimated wheel speed value and the second estimated wheel speed value in FIG. 1 described above.

The controller 3400 may determine a third estimated wheel speed value based on the number of revolutions per minute of the second motor 3320 when the third wheel speed sensor 3230 fails. Furthermore, the controller 3400 may determine a fourth estimated wheel speed value based on the number of revolutions per minute of the third motor 3330 when the fourth wheel speed sensor 3240 fails. Accordingly, the controller 3400 may determine the third estimated wheel speed value and the fourth estimated wheel speed value more accurately than the third estimated wheel speed value and the fourth estimated wheel speed value determined by the controller 1400 in FIG. 4.

The controller 3400 may determine the effective rolling radii of the tires based on the wheel speed value measured by the wheel speed sensors and the estimated wheel speed values in the case of a defective wheel speed sensor, and the controller may be configured to determine whether the tires have low pressure based on the resonant frequency value obtained from the wheel speed sensors and the determined effective rolling radii. That is, the controller 3400 of the vehicle 3000 may determine the estimated wheel speed values more accurately than the controller 1400 of the vehicle 1000 in FIG. 1, may determine whether a tire has a low pressure in more various situations, and may output information related to whether the tire has a low pressure to a user.

Hereinafter, a method of operating the vehicle control apparatus 100 will be described with reference to FIG. 8.

Figure 8:
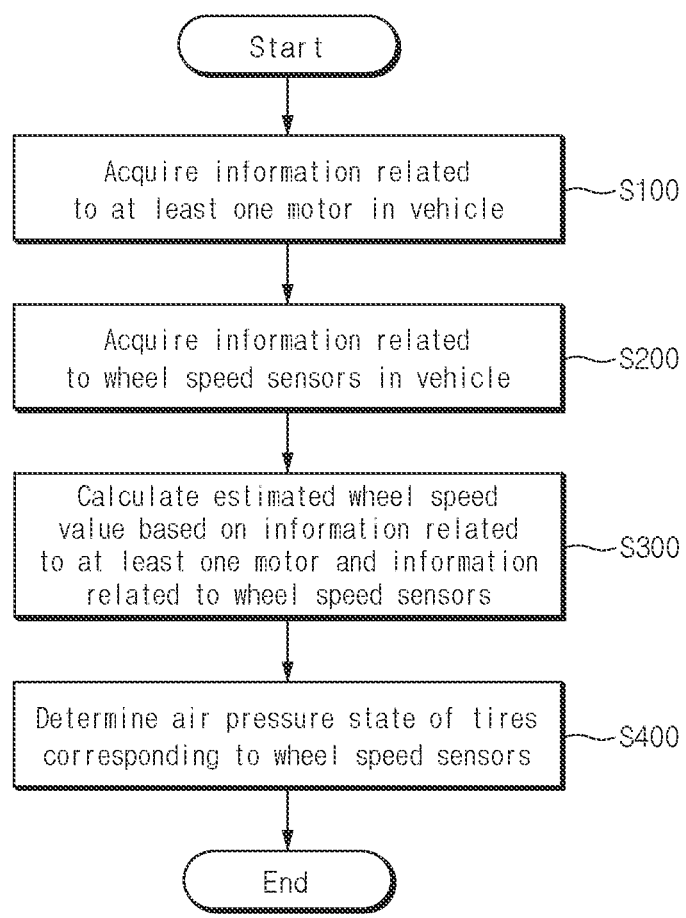
FIG. 8 illustrates a flowchart showing an operating method of a vehicle control apparatus according to an exemplary embodiment included in the present specification.

FIG. 8 illustrates a flowchart showing an operating method of a vehicle control apparatus according to an exemplary embodiment included in the present specification.

Referring to FIG. 8, the operating method of the vehicle control apparatus 100 according to an exemplary embodiment included in the present specification may include: acquiring information related to at least one motor in a vehicle (S100); acquiring information related to a plurality of wheel speed sensors in the vehicle (S200); determining an estimated wheel speed value based on the information related to at least one motor and the information related to the wheel speed sensors (S300); and determining an air pressure state of a tire corresponding to each of the wheel speed sensors based on the estimated wheel speed value and the information related to the wheel speed sensors (S400)

Hereinafter, steps S100 to S400 will be described in detail with reference to FIG. 1, FIG. 2, FIG. 6, and FIG. 7.

In step S100 of obtaining the information related to the at least one motor in the vehicle, the information acquisition device 110 may obtain information related to the at least one motor from the at least one motor. For example, in step S100, the information related to the at least one motor may include a number of revolutions per minute of the at least one motor.

In step S200 of acquiring information related to the wheel speed sensors in the vehicle, the information acquisition device 110 may obtain the information related to the wheel speed sensors 1200 in the vehicle. For example, in step S200, the information related to the wheel speed sensors 1200 may include failure information of the wheel speed sensors 1200 and wheel speed values measured by the wheel speed sensors 1200.

In the meantime, the wheel speed sensors 1200 may include the first wheel speed sensor 1210 and the second wheel speed sensor 1220 connected to the front wheels of the vehicle 1000, and the third wheel speed sensor 1230 and the fourth wheel speed sensor 1240 connected to the rear wheels of the vehicle 1000. In the instant case, the wheel speed sensors 1200 may include the first wheel speed sensor 2210 or 3210, which may be substantially the same as the first wheel speed sensor 1210, the second wheel speed sensor 2220 or 3220, which may be substantially the same as the second wheel speed sensor 1220, the third wheel speed sensor 2230 or 3230, which may be substantially the same as the third wheel speed sensor 1230, and the fourth wheel speed sensor 2240 or 3240, which may be substantially the same as the fourth wheel speed sensor 1240.

The at least one motor may include a first motor 1310 connected to the first wheel 1110 and a second wheel 1120 and the second motor 1320 connected to the third wheel 1130 and the fourth wheel 1140 in the vehicle 1000. Alternatively, the at least one motor may include a first motor 2310 connected to the first wheel 2110 and the second wheel 2120 in vehicle 2000. Alternatively, the at least one motor may include a first motor 3310 connected to the first wheel 3110 and the second wheel 3120, a second motor 3320 connected to the third wheel 3130, and a third motor 3330 connected to the fourth wheel 3140.

Furthermore, referring to FIG. 4, although it is shown that step S200 is performed after step S100 is performed, the present specification is not limited thereto, and step S200 may be performed before or simultaneously with step S100.

In step S300 of determining the estimated wheel speed value based on the information related to at least one motor and the information related to the wheel speed sensors, the calculator 120 may determine an estimated wheel speed value based on the information related to the at least one motor and the information related to the wheel speed sensors 1200. For example, in step S300, based on the failure information of the wheel speed sensors 1200, the calculator 120 may determine an estimated wheel speed value of the defective wheel speed sensor by use of the number of revolutions per minute of at least one motor and the wheel speed values measured by the wheel speed sensors 1200.

In the case where a number of motors is two, in step S300, when the first wheel speed sensor 1210 fails, the calculator 120 may determine a first estimated wheel speed value of the first wheel speed sensor 1210. For example, in step S300, the calculator 120 may determine the first estimated wheel speed value based on the number of revolutions per minute of the first motor 1310 and a wheel speed value measured by the second wheel speed sensor 1220. In step S300, the calculator 120 may determine the first estimated wheel speed value by subtracting the wheel speed value measured by the second wheel speed sensor 1220 from a value obtained by multiplying the revolutions per minute of the first motor 1310 by a constant multiple.

In the case where a number of motors is two, in step S300, when the second wheel speed sensor 1220 has failed, the calculator 120 may determine a second estimated wheel speed value of the second wheel speed sensor 1220. For example, in step S300, the calculator 120 may determine the second estimated wheel speed value based on the number of revolutions per minute of the first motor 1310 and a wheel speed value measured by the first wheel speed sensor 1210. In step S300, the calculator 120 may determine the second estimated wheel speed value by subtracting the wheel speed value measured by the first wheel speed sensor 1210 from a value obtained by multiplying the revolutions per minute of the first motor 1310 by a constant multiple.

In the case where a number of motors is two, in step S300, when both the first wheel speed sensor 1210 and the second wheel speed sensor 1220 have failed, the calculator 120 may determine the first estimated wheel speed value and the second estimated wheel speed value based on the number of revolutions per minute of the first motor 1310. For example, in step S300, the calculator 120 may assume that the first estimated wheel speed value and the second estimated wheel speed value have the same value, and accordingly, may determine the first estimated wheel speed value and the second estimated wheel speed value by multiplying the number of revolutions per minute of the first motor 1310 by a constant multiple.

In the case where a number of motors is two, in step S300, when the third wheel speed sensor 1230 has failed, the calculator 120 may determine a third estimated wheel speed value of the third wheel speed sensor 1230. For example, the calculator 120 may determine the third estimated wheel speed value based on the number of revolutions per minute of the second motor 1320 and a wheel speed value measured by the fourth wheel speed sensor 1240. The calculator 120 may determine the third estimated wheel speed value by subtracting the wheel speed value measured by the fourth wheel speed sensor 1240 from a value obtained by multiplying the revolutions per minute of the second motor 1320 by a constant multiple.

In the case where a number of motors is two, in step S300, when the fourth wheel speed sensor 1240 has failed, the calculator 120 may determine a fourth estimated wheel speed value of the fourth wheel speed sensor 1240. For example, in step S300, the calculator 120 may determine the fourth estimated wheel speed value based on the number of revolutions per minute of the second motor 1320 and a wheel speed value measured by the third wheel speed sensor 1230. In step S300, the calculator 120 may determine the fourth estimated wheel speed value by subtracting the wheel speed value measured by the third wheel speed sensor 1230 from a value obtained by multiplying the revolutions per minute of the second motor 1320 by a constant multiple.

In the case where a number of motors is two, in step S300, when both the third wheel speed sensor 1230 and the fourth wheel speed sensor 1240 have failed, the calculator 120 may determine the third estimated wheel speed value and the fourth estimated wheel speed value based on the number of revolutions per minute of the second motor 1320. For example, in step S300, the calculator 120 may assume that the third estimated wheel speed value and the fourth estimated wheel speed value have the same value, and accordingly, may determine the third estimated wheel speed value and the fourth estimated wheel speed value by multiplying the number of revolutions per minute of the second motor 1320 by a constant multiple.

In the case where a number of motors is two, in step S300, the calculator 120 may determine a first estimated wheel speed value and a second estimated wheel speed value in a same way as the method by which the calculator 120 determines the first wheel speed value and the second wheel speed value in step S300 when the number of motors is two. However, when one motor is used, in step S300, in the case of the third estimated wheel speed value and the fourth estimated wheel speed value, the calculator 120 may not be able to estimate them because there are no motors connected to the third wheel 2130 and the fourth wheel 2140.

In the case where the number of motors is three, in step S300, the calculator 120 may determine a first estimated wheel speed value and a second estimated wheel speed value in a same way as the method by which the calculator 120 determines the first wheel speed value and the second wheel speed value in step S300 when the number of motors is two.

In the instant case, in the case where the number of motors is three, in step S300, there is the second motor 3320 connected only to the third wheel 3130, and thus the calculator 120 may determine a third estimated wheel speed value based on the number of revolutions per minute of the second motor 3320 when the third wheel speed sensor 3230 fails.

Similarly, in the case where the number of motors is three, in step S300, there is the third motor 3330 connected only to the fourth wheel 3140, and thus the calculator 120 may determine a third estimated wheel speed value based on the number of revolutions per minute of the third motor 3330 when the fourth wheel speed sensor 3240 fails. That is, when the number of motors is three, in step S300, the calculator 120 may determine the third estimated wheel speed value and the fourth estimated wheel speed value more accurately than when the number of motors is two.

In step S400 of determining the air pressure state of the tire corresponding to each of the wheel speed sensors based on the estimated wheel speed value and the information related to the wheel speed sensors, the controller 130 may determine an air pressure state of a tire corresponding to each of the wheel speed sensors 1200 based on the estimated wheel speed value determined by the calculator 120 and information related to the wheel speed sensors 1200. For example, the information related to the wheel speed sensors 1200 may include resonance frequency values and wheel speed values measured by the wheel speed sensors 1200.

In step S400, the controller 130 may determine effective rolling radii of the tires based on the wheel speed values and the estimated wheel speed value measured by the wheel speed sensors 1200, and may determine whether the tires have a low pressure based on the effective rolling radii of the tires and the resonant frequency values measured by the wheel speed sensors 1200.

Hereinafter, a method of operating the vehicle control apparatus 100 will be described in detail with reference to FIG. 9.

Figure 9:
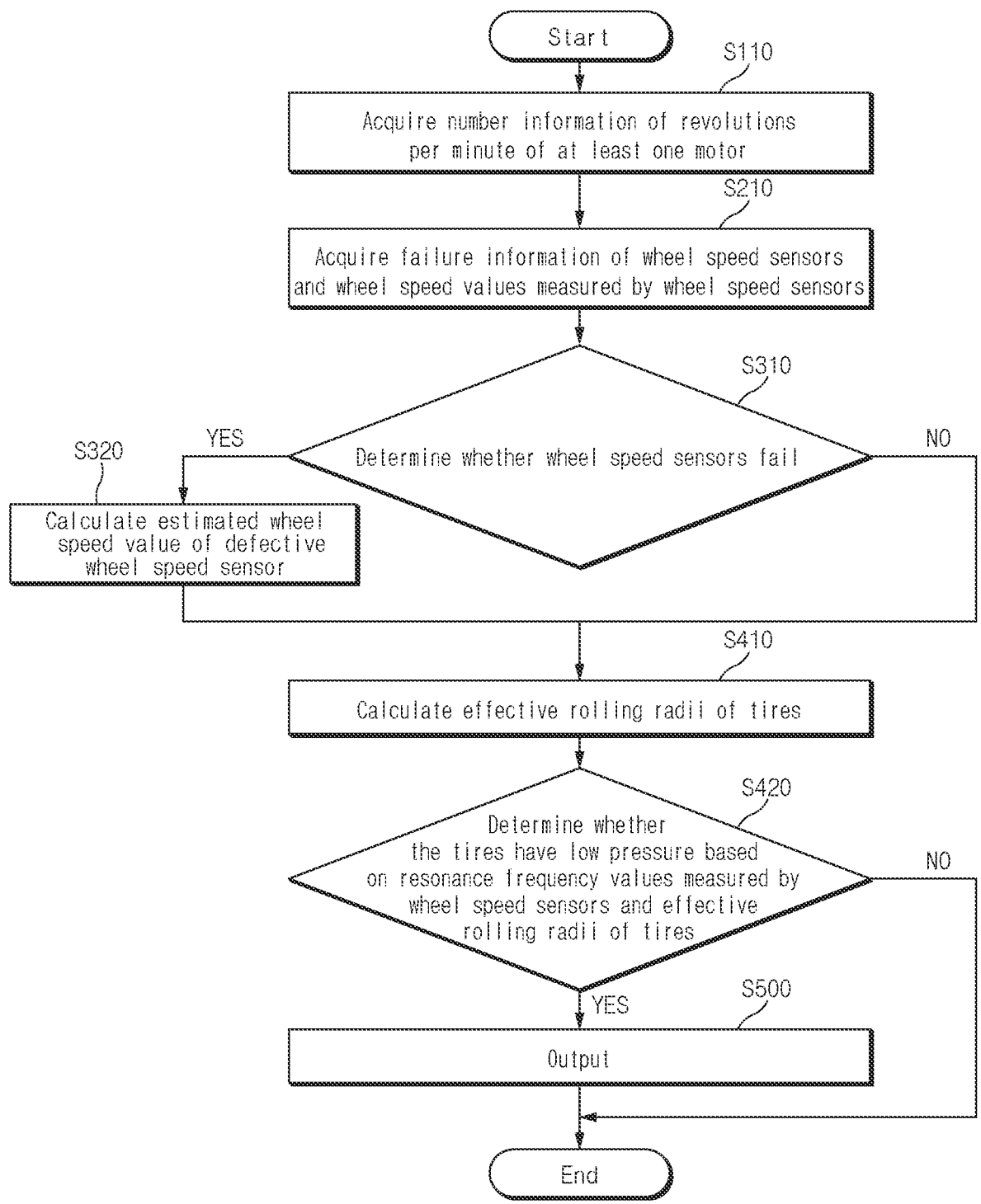
FIG. 9 illustrates a flowchart specifically showing an operating method of a vehicle control apparatus according to an exemplary embodiment included in the present specification.

FIG. 9 illustrates a flowchart showing an operating method of a vehicle control apparatus according to an exemplary embodiment included in the present specification.

Referring to FIG. 9, the operating method of the vehicle control apparatus 100 according to an exemplary embodiment included in the present specification may include: acquiring information related to the number of revolutions per minute of at least one motor (S110); acquiring failure information of a plurality of wheel speed sensors and wheel speed values measured by the wheel speed sensors (S210); determining whether the wheel speed sensors fail (S310); determining an estimated wheel speed value of the defective wheel speed sensor (S320), determining effective rolling radii of tires (S410); determining whether the tires have a low pressure based on resonance frequency values measured by the wheel speed sensors and the effective rolling radii of the tires (S420) and outputting (S500).

In step S110 of acquiring the information related to the number of revolutions per minute of the at least one motor, the information acquisition device 110 may obtain the information related to the number of revolutions per minute from the at least one motor. For example, step S100 in FIG. 8 may include step S110.

In step S210 of acquiring the failure information of the wheel speed sensors and the wheel speed values measured by the wheel speed sensors, the information acquisition device 110 may obtain the failure information of the wheel speed sensors 1200 from the wheel speed sensors 1200 and the wheel speed values measured by the wheel speed sensors 1200. For example, in step S210, the information acquisition device 110 may not acquire the measured wheel speed value in the case of a defective wheel speed sensor among the wheel speed sensors 1200. Step S200 in FIG. 8 may include step S210.

In step S310 of determining whether the wheel speed sensors fail, the calculator 120 may determine whether each wheel speed sensor fails based on the obtained failure information of the wheel speed sensors 1200.

In step S320 of determining the estimated wheel speed value of the defective wheel speed sensor, the calculator 120 may determine an estimated wheel speed value of the defective wheel speed sensor based on information related to the number of revolutions per minute of at least one motor and the wheel speed values measured by the wheel speed sensors 1200. For example, a process of determining the estimated wheel speed value by the calculator 120 in step S320 may be substantially the same as the process by which the calculator 120 determines the estimated wheel speed value in step S300 described above.

In step S410 of determining the effective rolling radii of the tires, the controller 130 may determine an effective rolling radius of a corresponding tire based on the estimated wheel speed value in the case of the defective wheel speed sensor, and the wheel speed sensor, which is not a failure, may determine the effective rolling radius of the corresponding tire based on the wheel speed value measured by the wheel speed sensor. For example, the controller 130 may determine an effective rolling radius of a tire coupled to the first wheel 1110 based on the first estimated wheel speed value when the first wheel speed sensor 1210 fails, and may determine the effective rolling radius of the tire coupled to the first wheel 1110 based on the wheel speed value of the first wheel 1110 measured by the first wheel speed sensor 1210 when the first wheel speed sensor 1210 does not fail.

In step S420 of determining whether the tires have the low pressure based on the resonance frequency values measured by the wheel speed sensors and the effective rolling radii of the tires, the controller 130 may obtain the resonant frequency values of the tires when at least one wheel speed sensor of the wheel speed sensors 1200 does not fail, and may determine whether the tires have the low pressure based on the resonant frequency values of the tires and the determined effective rolling radii of the tires. For example, the controller 130 may determine whether the tires have the low pressure by comparing the effective rolling radii and the resonance frequency values of the tires, which have predetermined normal pressures, with the determined effective rolling radii and the resonance frequency values of the tires.

On the other hand, in step S420, when all of the wheel speed sensors 1200 are defective, the controller 130 may be unable to obtain the resonant frequency values of the tires, and thus may determine whether the tires have the low pressure based only on the effective rolling radii of the tires.

The operation method of the vehicle control apparatus 100 according to an exemplary embodiment included in the present specification may further include an output step S500.

In the output step S500, when the controller 130 determines that at least one tire has a low pressure, the output device 140 may output information related to the low-pressure tire. For example, when it is determined whether a tire has a low pressure and a position of the low-pressure tire is determined, the output device 140 may output information related to whether the tire has a low pressure and position information of the low-pressure tire. Furthermore, in the output step S500, when only determining whether the tire has the low pressure, the output device 140 may output information related to whether the tire has the low pressure.

In the output step S500, the output device 140 may output information related to an error of a low tire pressure detection device when at least one wheel speed sensor fails and it is impossible to detect whether at least one tire has a low pressure. That is, the user may check whether the tire has the low pressure and whether the tire low pressure detection device fails based on the information outputted from the output device 140, may repair the vehicle, and may enable safe driving.

In another exemplary embodiment included in the present specification, controllers connected to the wheel speed sensors 1200 inside the vehicle 1000 may determine the estimated wheel speed value which may be replaced when there is a failure of the wheel speed sensors 1200 by use of the method of determining the estimated wheel speed value described above. For example, the function of the system may be limited, but maintained, reducing the risk of causing a dangerous situation to the driver by use of a method of determining the estimated wheel speed value when there is a failure of the plurality of wheel speed sensors 1200 described above in a controller that performs various roles such as smart cruise control (SCC), electronic control suspension (ECS), and electronic stability control) using wheel speed values.

In another exemplary embodiment included in the present specification, the vehicle 1000 may reversely use the estimated wheel speed value determination method to determine an estimated number of revolutions per minute of at least one motor based on the wheel speed values measured by the wheel speed sensors 1200 in the case where there is a failure in RPM information of the at least one motor. For example, the controller configured for a traction control system (TCS) function utilizes the number of revolutions per minute of the motor, and thus when there is the failure in the RPM information of the at least one motor, it is possible to solve a problem of sudden performance degradation of the TCS function due to the failure in the RPM value of the at least one motor by estimating the number of revolutions per minute of the motor based on the wheel speed values measured by the wheel speed sensors 1200 and using it in the controller.

The above description is merely illustrative of the technical idea included in the present specification, and those skilled in the art to which exemplary embodiments included in the present specification pertains may make various modifications and variations without departing from the essential characteristics of the exemplary embodiments included in the present specification.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle control apparatus comprising:
a controller configured to determine an estimated wheel speed value according to information related to at least one motor and information related to a plurality of wheel speed sensors,
wherein the controller is further configured to determine an air pressure state of a tire corresponding to each of the plurality of wheel speed sensors of a vehicle according to the estimated wheel speed value and the information related to the plurality of wheel speed sensors,
wherein the controller is further configured to:
estimate a wheel speed value of a defective wheel speed sensor using a wheel speed value of a wheel speed sensor among the plurality of wheel speed sensors in which a failure has not occurred based on that at least one wheel speed sensor among the plurality of wheel speed sensors fails,
determine a tire pressure using the estimated wheel speed value, and
inform a user of the air pressure state,
wherein the at least one motor includes at least one of a first motor connected to front wheels of the vehicle and a second motor connected to rear wheels of the vehicle,
wherein the plurality of wheel speed sensors include a first wheel speed sensor and a second wheel speed sensor engaged to the front wheels of the vehicle, and a third wheel speed sensor and a fourth wheel speed sensor engaged to the rear wheels of the vehicle, and
wherein the controller is further configured to determine a first estimated wheel speed value of the first wheel speed sensor and a second estimated wheel speed value of the second wheel speed sensor according to a number of revolutions per minute of the first motor, and assume the first estimated wheel speed value and the second estimated wheel speed value are the same based on that the first wheel speed sensor and the second wheel speed sensor fail.

2. The vehicle control apparatus of claim 1,
wherein the information related to the at least one motor includes a number of revolutions per minute of the at least one motor, and
wherein the information related to the plurality of wheel speed sensors includes failure information of the plurality of wheel speed sensors and wheel speed values measured by the plurality of wheel speed sensors.

3. The vehicle control apparatus of claim 1,
wherein the controller is further configured to determine the first estimated wheel speed value of the first wheel speed sensor according to the number of revolutions per minute of the first motor and a wheel speed value measured by the second wheel speed sensor based on that the first wheel speed sensor fails, and
wherein the controller is further configured to determine the second estimated wheel speed value of the second wheel speed sensor according to the number of revolutions per minute of the first motor and a wheel speed value measured by the first wheel speed sensor based on that the second wheel speed sensor fails.

4. The vehicle control apparatus of claim 1,
wherein the controller is further configured to determine a third estimated wheel speed value of the third wheel speed sensor according to a number of revolutions per minute of the second motor and a wheel speed value measured the fourth wheel speed sensor based on that the third wheel speed sensor fails, and
wherein the controller is further configured to determine a fourth estimated wheel speed value of the fourth wheel speed sensor according to the number of revolutions per minute of the second motor and a wheel speed value measured by the third wheel speed sensor based on that the fourth wheel speed sensor fails.

5. The vehicle control apparatus of claim 1, wherein the controller is further configured to determine a third estimated wheel speed value of the third wheel speed sensor and a fourth estimated wheel speed value of the fourth wheel speed sensor according to a number of revolutions per minute of the second motor based on that the third wheel speed sensor and the fourth wheel speed sensor fail.

6. The vehicle control apparatus of claim 1,
wherein the information related to the plurality of wheel speed sensors includes wheel speed values measured by the plurality of wheel speed sensors and resonant frequency values measured by the plurality of wheel speed sensors, and
wherein the controller is further configured to determine effective rolling radii of the tires according to the wheel speed values measured by the plurality of wheel speed sensors and the estimated wheel speed value, and to determine whether the tires have a low pressure according to the resonance frequency values measured by the plurality of wheel speed sensors and the effective rolling radii of the tires.

7. The vehicle control apparatus of claim 1,
wherein the air pressure state includes information related to whether at least one of the tires has a low pressure.

8. A method of operating of a vehicle control apparatus, the method comprising:
acquiring, by a controller, information related to at least one motor in a vehicle;
acquiring, by the controller, information related to a plurality of wheel speed sensors in the vehicle;
determining, by the controller, an estimated wheel speed value according to the information related to the at least one motor and the information related to the plurality of wheel speed sensors;
determining, by the controller, an air pressure state of a tire corresponding to each of the plurality of wheel speed sensors according to the estimated wheel speed value and the information related to the plurality of wheel speed sensors; and
informing a user of the air pressure state,
wherein the determining the estimated wheel speed value includes:
estimating a wheel speed value of a defective wheel speed sensor using a wheel speed value of a wheel speed sensor among the plurality of wheel speed sensors in which a failure has not occurred based on that at least one wheel speed sensor among the plurality of wheel speed sensors fails, and
determining a tire pressure using the estimated wheel speed value,
wherein the at least one motor includes at least one of a first motor connected to front wheels of the vehicle and a second motor connected to rear wheels of the vehicle, wherein the plurality of wheel speed sensors include a first wheel speed sensor and a second wheel speed sensor engaged to the front wheels of the vehicle, and a third wheel speed sensor and a fourth wheel speed sensor engaged to the rear wheels of the vehicle, and wherein in the determining of the estimated wheel speed value according to the information related to the at least one motor and the information related to the plurality of wheel speed sensors, the controller is further configured to determine a first estimated wheel speed value of the first wheel speed sensor and a second estimated wheel speed value of the second wheel speed sensor according to a number of revolutions per minute of the first motor, and assume the first estimated wheel speed value and the second estimated wheel speed value are the same based on that the first wheel speed sensor and the second wheel speed sensor fail.

9. The method of claim 8,
wherein the information related to the at least one motor includes a number of revolutions per minute of the at least one motor, and
wherein the information related to the plurality of wheel speed sensors includes failure information of the plurality of wheel speed sensors and wheel speed values measured by the plurality of wheel speed sensors.

10. The method of claim 9, wherein the determining of the estimated wheel speed value according to the information related to the at least one motor and the information related to the plurality of wheel speed sensors includes:
determining the first estimated wheel speed value of the first wheel speed sensor according to the number of revolutions per minute of the first motor and a wheel speed value measured by the second wheel speed sensor based on that the first wheel speed sensor fails; and
determining a second estimated wheel speed value of the second wheel speed sensor according to the number of revolutions per minute of the first motor and a wheel speed value measured by the first wheel speed sensor based on that the first wheel speed sensor fails.

11. The method of claim 9, wherein the determining of the estimated wheel speed value according to the information related to the at least one motor and the information related to the plurality of wheel speed sensors includes:
determining a third estimated wheel speed value of the third wheel speed sensor according to a number of revolutions per minute of the second motor and a wheel speed value measured the fourth wheel speed sensor based on that the third wheel speed sensor fails; and
determining a fourth estimated wheel speed value of the fourth wheel speed sensor according to the number of revolutions per minute of the second motor and a wheel speed value measured by the third wheel speed sensor based on that the fourth wheel speed sensor fails.

12. The method of claim 9, wherein the determining of the estimated wheel speed value according to the information related to the at least one motor and the information related to the plurality of wheel speed sensors includes:
determining a third estimated wheel speed value of the third wheel speed sensor and a fourth estimated wheel speed value of the fourth wheel speed sensor according to a number of revolutions per minute of the second motor based on that the third wheel speed sensor and the fourth wheel speed sensor fail.

13. The method of claim 8,
wherein the information related to the plurality of wheel speed sensors includes wheel speed values measured by the plurality of wheel speed sensors and resonant frequency values measured by the plurality of wheel speed sensors, and wherein the determining of the air pressure state of the tire corresponding to each of the plurality of wheel speed sensors according to the estimated wheel speed values and the information related to the plurality of wheel speed sensors includes:
determining effective rolling radii of the tires according to the wheel speed values measured by the plurality of wheel speed sensors and the estimated wheel speed value; and
determining whether the tires have a low pressure according to the resonance frequency values measured by the plurality of wheel speed sensors and the effective rolling radii of the tires.

14. A vehicle comprising:
a plurality of wheels;
a plurality of wheel speed sensors for measuring information related to the plurality of wheels;
at least one motor connected to the plurality of wheels; and
a controller electrically connected to the plurality of wheel speed sensors and configured:
to acquire information related to the plurality of wheel speed sensors and to acquire information related to the at least one motor,
to determine estimated wheel speed values of the plurality of wheels according to the information related to the plurality of wheel speed sensors and the information related to the at least one motor,
to determine an air pressure state of a tire corresponding to each of the plurality of wheel speed sensors according to the estimated wheel speed values and the information related to the plurality of wheel speed sensors, and
to inform a user of the air pressure state,
wherein the controller is further configured to:
estimate a wheel speed value of a defective wheel speed sensor using a wheel speed value of a wheel speed sensor among the plurality of wheel speed sensors in which a failure has not occurred based on that at least one wheel speed sensor among the plurality of wheel speed sensors fails, and
determine a tire pressure using the estimated wheel speed value,
wherein the at least one motor includes at least one of a first motor connected to front wheels of the vehicle and a second motor connected to rear wheels of the vehicle,
wherein the plurality of wheel speed sensors include a first wheel speed sensor and a second wheel speed sensor engaged to the front wheels of the vehicle, and a third wheel speed sensor and a fourth wheel speed sensor engaged to the rear wheels of the vehicle, and
wherein the controller is further configured to determine a first estimated wheel speed value of the first wheel speed sensor and a second estimated wheel speed value of the second wheel speed sensor according to a number of revolutions per minute of the first motor, and assume the first estimated wheel speed value and the second estimated wheel speed value are the same based on that the first wheel speed sensor and the second wheel speed sensor fail.

15. The vehicle of claim 14,
wherein the information related to the plurality of wheel speed sensors includes whether the plurality of wheel speed sensors fail and wheel speed values of the plurality of wheels measured by the plurality of wheel speed sensors, and wherein the information related to the at least one motor includes a number of revolutions per minute of the at least one motor.

\* \* \* \* \*